Oct. 11, 1927.
T. J. SCHUETZ
1,645,162
ATTACHMENT FOR MOTOR VEHICLES
Filed Aug. 14, 1926  2 Sheets-Sheet 1
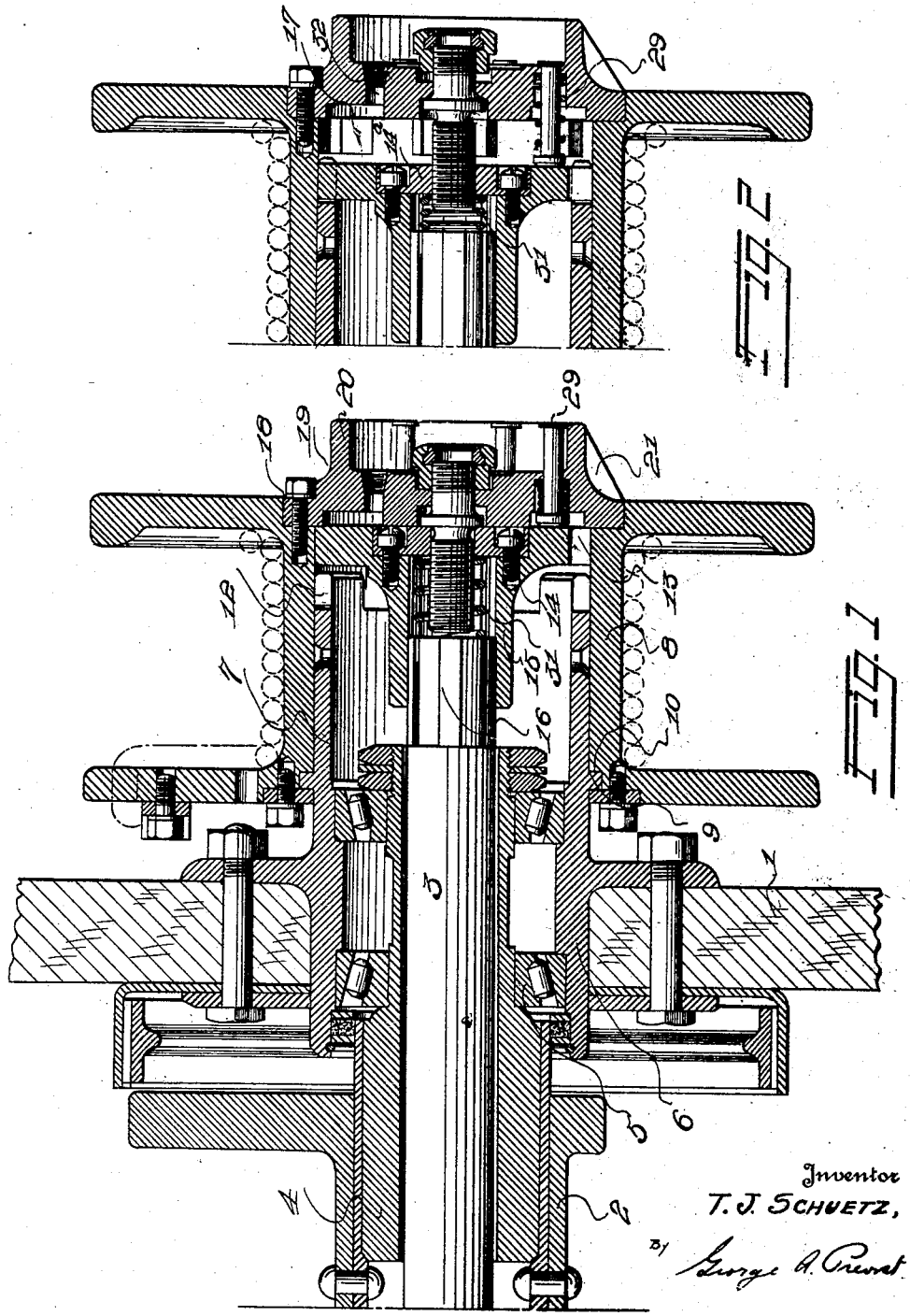
Inventor
T. J. SCHUETZ,
By George A. Prevost
Attorney Oct. 11, 1927.
T. J. SCHUETZ
1,645,162
ATTACHMENT FOR MOTOR VEHICLES
Filed Aug. 14, 1926
2 Sheets-Sheet 2
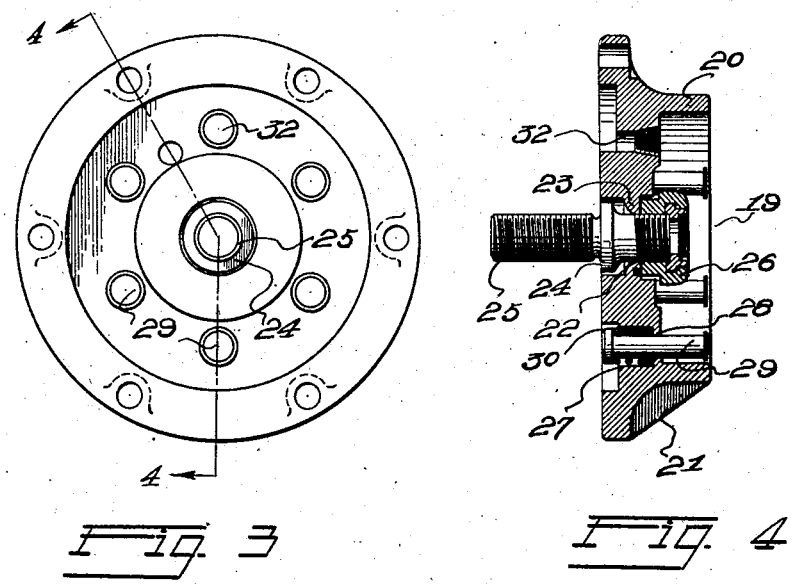
Fig. 3
Fig. 4
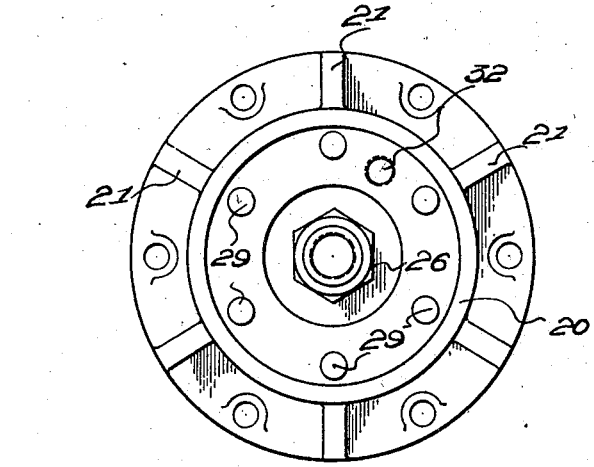
Fig. 5
Inventor
T. J. SCHUETZ,
By
Attorney Patented Oct. 11, 1927.

1,645,162

UNITED STATES PATENT OFFICE.

THOMAS J. SCHUETZ, OF TULSA, OKLAHOMA.

ATTACHMENT FOR MOTOR VEHICLES.

Application filed August 14, 1926. Serial No. 129,172.

My invention consists in new and useful improvements in drum covers adapted to be used in connection with devices for taking power from the rear axle of a motor vehicle such as shown and described in my copending applications Serial Nos. 62,065 and 62,066, and the pending application of John C. Thomas, Serial No. 74,043.

Heretofore, it has been my experience that when using a winch equipped with the old type drum cover for hoisting various heavy objects, they are sometimes forced against or rolled against the drum cover, breaking or bending the operating nut which projects from the center thereof, rendering the same useless.

It is therefore one of the objects of my present invention to overcome this disadvantage, and provide a drum cover equipped with a circular ring, so arranged as to serve, not only as a protection for the operating nut, but a general reinforcement for the plate or cover itself.

It is a further object of this invention to mount the spring actuated ejector pins in the drum cover instead of in the sliding clutch member, thereby avoiding the necessity of machining counter-sunk apertures in the region of the tooth root of said clutch member, which obviously weakens the structure of said teeth.

A further advantage of my improved drum cover is that it provides for visibility of the operation of the sliding clutch through the medium of the ejector pins which operate in apertures in said cover.

With the above and other objects in view which will appear as the description proceeds, my invention consists in the novel features herein set forth, illustrated in the accompanying drawings, and more particularly pointed out in the appended claims.

Referring to the drawings, in which numerals of like character designate similar parts throughout the several views:

Fig. 1 is a cross sectional view of the rear wheel of a motor vehicle equipped with a power taking device showing my improved drum cover in place, the clutch being in drum engaging position.

Fig. 2 is a view of a portion of the drum showing the clutch in hub engaging position.

Fig. 3 is a view taken from the under side of my drum cover.

Fig. 4 is a detail cross sectional view of the same, and

Fig. 5 is a plan view of the cover and operating nut.

In the drawings, 1 designates an ordinary driving wheel of an automobile, 2 the rear axle housing, 3 the axle shaft, and 4 a spindle arranged within said housing surrounding said shaft, and adapted to engage suitable bearings 5 in the hub 6 of said wheel. The hub 6 functions as a wheel mounting and projects outwardly beyond said wheel for a suitable length to serve as a bearing 7 for the drum 8 or other appliance rotatably mounted thereon. The inner end of the bearing 7 is provided with a circumferentially extending integral flange 9 adapted to fit into a circular recess 10 which extends around the inner edge of the inner surface of the drum 8, whereby said drum is maintained in place on said bearing when a retaining ring 11 is bolted within a larger recess adjoining said recess 10 in the inner wall of said drum.

The outer edge of the bearing 7 is provided with a series of circumferentially extending longitudinal teeth 12, adapted to register with a series of circumferentially extending lateral teeth 13, on the sliding clutch 14, said last named teeth being provided with curved or arc-shaped outer faces as described in my copending applications. This clutch comprises a reduced elongated part 15 provided on its inner surface with a series of longitudinal grooves for engaging the splines 16 on the reduced outer end of the shaft 3.

The inner surface of the drum 8 is provided at its outer end with a series of circumferentially extending teeth 17, (see Fig. 2) also adapted to be engaged by the clutch teeth 13 as will be hereinafter described. The outer face of the outer wall of the drum 8 is recessed as at 18, to receive a drum cover 19, which comprises a disc-shaped base portion provided with a circular ring 20, which projects outwardly for a suitable distance for the purpose hereinafter described, and is reinforced by a plurality of sloping webs 21. The central portion of the base member of the drum cover 19 is bored as at 22 and provided with a circular flange 23, the inner edge of which is rounded to register with a flange 24 on the operating screw 25, when the two abut. One end of this screw is threaded to engage a threaded aperture in the clutch plate 14ᵃ, while the other end projects through the aperture 22 in the cover 19, and is threaded to engage the operating nut 26 which is adapted to be screwed thereon and permanently secured in place in the manner described in my copending applications before referred to.

At predetermined points within the boundaries of the circular ring 20 of the cover 19, I provide adjoining recesses 27 and apertures 28, in which ejector pins 29 equipped with actuating springs 30 are adapted to reciprocate, the inner ends of said pins abutting the outer face of the clutch and maintaining an inward pressure against the same, due to said springs 30. 32 represents a lubricating aperture in the base of the cover 19 which may be threaded to receive a plug.

Within the reduced portion 15 of the clutch, abutting the inner surface of the clutch plate 14ᵃ at one end, and the end of the axle shaft at the other end, I provide a coil spring 31 which surrounds the actuating screw and maintains an outward pressure against the clutch member.

The operation of my device is practically identical with that of my aforementioned copending applications.

By turning the nut 26 with a suitable wrench in a counter-clockwise direction, the clutch is forced inwardly, due to the pressure exerted by the ejector pin springs 30, until the angular faces of the clutch teeth abut the outer faces of the corresponding hub teeth. This counter-clockwise movement is continued until the flange 24 on the draw screw abuts the flange 23 in the aperture 22, at which time the springs on the ejector pins are fully retracted, exerting a continuous pressure against the face of the clutch member tending to push the same inwardly. The drum is then turned forward by hand until the clutch teeth, due to their angular inner faces, find their way into alignment with the hub teeth in the end of the bearing 7, when the springs of the ejector pins will cause them to engage. The operating screw is again turned counter-clockwise until the aforesaid engagement is complete. As the teeth engage, the ejector pin springs are released and the spring 31 in the clutch is compressed, as clearly shown in Fig. 2.

In this position of the parts, the power driven shaft 3 will cause the rotation of the clutch which in turn rotates the rear wheel through the medium of the projected hub 6.

To cause the clutch to disengage the wheel and operate the drum free from the same, the operating screw is turned in clockwise direction, which movement releases the outward pressure on the clutch plate 14ᵃ, the clutch being forced outwardly by the spring 31 until the arc-shaped teeth abut the corresponding drum teeth 17. The drum is then turned by hand in another direction until the arc-shaped faces of the clutch teeth find their way into alignment with said drum teeth, when the clutch is forced outwardly by the spring 31 and with it the draw screw, until the flange 24 abuts the flange 23. This clockwise movement is continued until the engagement is complete, and the shoulder of the nut on the operating screw abuts the outer edge of the flange 23 and locks the mechanism, as shown in Fig. 1.

The shaft 3 will now rotate the clutch which in turn will operate the drum free from the wheels, thus avoiding the necessity of jacking the rear wheels of a vehicle.

With this improved drum cover, it will be seen that the operating nut and the ejector pins are fully protected by the circular ring 20, and that the position of the clutch and operation of the ejector pins may be readily viewed by the operator due to the fact that said ejector pins project outwardly when the clutch is in drum engaging position.

From the foregoing, it is believed that my invention may be clearly understood without further description, it being borne in mind that numerous changes may be made in the details of construction without departing from the spirit of the invention as disclosed in the following claims.

What I claim and desire to secure by Letters Patent is:

1. In a device for taking power from a shaft, a drum, a drum cover comprising a disc provided with an outwardly projecting ring, a plurality of apertures in said disc within the circumference of said ring, spring actuated plungers mounted in said apertures and adapted to reciprocate therein and within the confines of said ring.

2. In a device for taking power from a shaft, a disc provided with an outwardly projecting ring, a series of apertures in said disc, adjacent the inner wall of said ring, spring actuated plungers mounted in said apertures and adapted to reciprocate therein, a centrally located aperture in said disc, an operating screw rotatably mounted in said aperture, and an operating nut on the outer end of said screw, said plungers, screw and nut functioning within the confines of said ring.

3. In a device for taking power from a shaft, as claimed in claim 1, wherein said ring is provided with a plurality of reinforcing deflectors.

4. In a motor driven vehicle, the combination of a rear axle, a road wheel rotatable about the axis of said axle and having a hub, a drum coaxial with the axle and rotatably mounted on said hub, a clutch slidably mounted on one end of said axle and adapted to operatively engage either the hub or the drum, a cover plate secured on said drum, an operating screw rotatably mounted in said cover engaging the clutch, spring actuated means within said clutch for maintaining an outward pressure against the same, and spring actuated means in said cover adjacent said clutch for forcing the same inwardly.

5. In a motor driven vehicle, the combination of a rear axle, a road wheel rotatable about the axis of said axle and having a hub, a drum coaxial with the axle and rotatably mounted on said hub, a clutch slidably mounted on one end of said axle and adapted to operatively engage either the hub or the drum, a cover plate mounted on said drum and comprising a disc provided with an outwardly projecting ring, an operating screw rotatably mounted in said disc engaging the clutch, spring actuated means within said clutch for maintaining an outward pressure against the same, and spring actuated means located in said disc for forcing said clutch inwardly, said operating screw and spring actuated means in the disc being within the confines of said ring.

6. The combination as claimed in claim 5, wherein the means for forcing the clutch inwardly comprises a series of spring actuated plungers mounted in apertures in said disc and adapted to reciprocate therein, their inner ends abutting the outer face of said clutch.

In testimony whereof I affix my signature.

THOMAS J. SCHUETZ.